US005936666A

United States Patent [19]

Davis

[11] Patent Number: 5,936,666

[45] **Date of Patent: *Aug. 10, 1999**

[54] SECURITY SENSOR ARRANGEMENT

[75] Inventor: Andrew Lennox Davis, The Levels, Australia

[73] Assignee: Vision Systems Limited, South Australia, Australia

[ * ] Notice: This patent issued on a continued prosecution application filed under 37 CFR 1.53(d), and is subject to the twenty year patent term provisions of 35 U.S.C. 154(a)(2).

[21] Appl. No.: 08/669,081

[22] Filed: Jun. 24, 1996

[51] Int. Cl.[6] .............................. H04N 7/18; H04N 9/47; H04N 5/33

[52] U.S. Cl. .......................... 348/143; 348/152; 348/159; 348/164

[58] Field of Search .................................... 348/143, 152, 348/218, 153, 154, 155, 159, 164, 157; H04N 7/18, 9/47, 5/33

[56] References Cited

U.S. PATENT DOCUMENTS

| | | | |
|---|---|---|---|
| 4,239,356 | 12/1980 | Freudenschuss et al. | 354/23 |
| 4,249,207 | 2/1981 | Harman et al. | 358/108 |
| 4,383,170 | 5/1983 | Takagi et al. | 348/218 |
| 4,737,847 | 4/1988 | Araki et al. | 358/108 |
| 4,772,875 | 9/1988 | Maddox et al. | 348/152 |
| 4,905,315 | 2/1990 | Solari et al. | 318/640 |
| 5,153,722 | 10/1992 | Goedeke et al. | 358/108 |
| 5,241,380 | 8/1993 | Benson et al. | 348/143 |
| 5,455,561 | 10/1995 | Brown | 340/541 |
| 5,473,368 | 12/1995 | Hart | 348/155 |
| 5,537,155 | 7/1996 | O'Connell et al. | 348/699 |

*Primary Examiner*—Bryan Tung
*Assistant Examiner*—Nhon T. Diep
*Attorney, Agent, or Firm*—Klauber & Jackson

[57] ABSTRACT

In one embodiment, the present invention provides an apparatus which includes at least two sensors whose overlapping fields of view are matched by sectorization. Sensor signal output processing of a high resolution sensor and a low resolution sensor provide a detection device which achieves a substantially higher performance over devices which only logically combine the outputs of two individual detectors. In a particular embodiment, the high resolution sensor senses a visible wavelength, such as by video camera, and the low resolution is an infrared thermal sensor.

16 Claims, 4 Drawing Sheets

FIG II

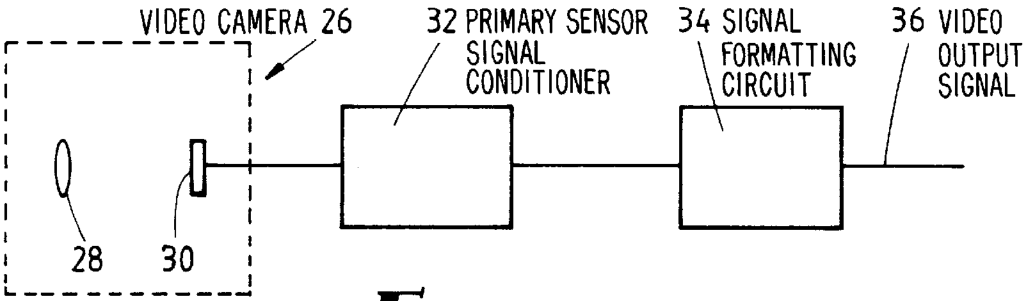
FIG 5
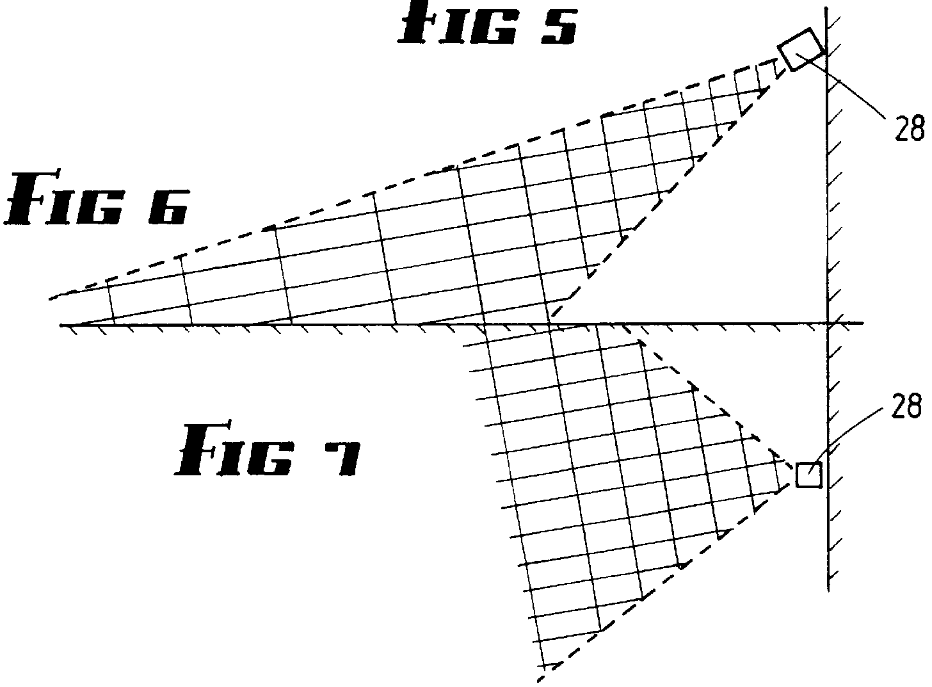
FIG 6
FIG 7
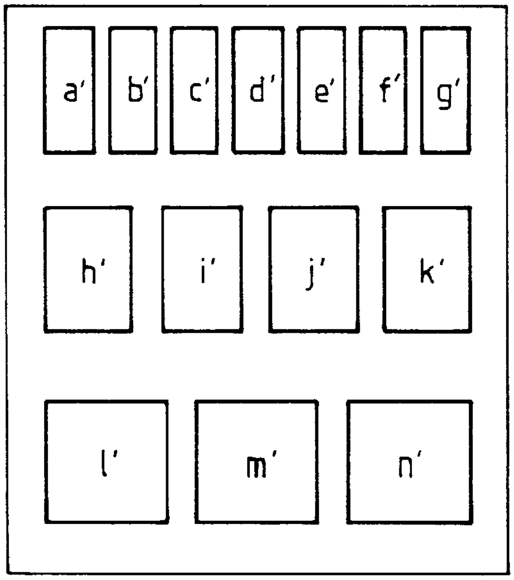
FIG 8

SECURITY SENSOR ARRANGEMENT

This invention relates to surveillance and security apparatus and in particular to the substantial matching of the characteristics or portions of the fields of view of one sensor to another sensor and the beneficial uses of that matching in surveillance and security systems.

BACKGROUND

This invention relates generally to sensors and as an example of their use this specification describes security apparatus and in particular various types of sensors used to determine whether a predetermined condition exists and whether that condition should trigger an appropriate response in the context of a security environment.

In one example of a single sensor security apparatus, a passive infrared (PIR) detector sensor is used to sense the presence of a heat radiating body (typically an unauthorized person) in its field of view. In a further example of a single sensor used in a security environment a video camera can provide both a visual indication of the presence of a body (also typically an unauthorised person) in its field of view, and motion detection by analysing the time changing video signal.

It is known for a single sensor to provide a signal which when suitably processed and compared with a predetermined condition can indicate for example the presence of an unauthorised person but it is also likely to detect other effects (e.g. air disturbance, heating, small animals, etc) which may also match predetermined conditions and inappropriate responses may occur as a result, Surveillance systems which use very broadly defined predetermined conditions often falsely trigger. However on the other hand very narrowly defined predetermined conditions may only trigger a response when obvious intrusions into an area occur which risk missing a less obvious but equally potentially damaging intrusion into the area within the field of view of the single sensor.

Both extremes are undesirable,

It is also known to use quite sophisticated predetermined conditions which are designed to tailor the various intrusion conditions to the characteristics of the sensor and lessen the likelihood of false triggering.

In one example, it is known to electronically process the output of a PIR sensor to enhance those signals that will improve the determination of whether there exists a heat radiating body of a particular type. Those signals can also be enhanced so that the rate of movement of the intruder through the field of view of the PIR sensor can be determined. Thus, it is possible, using these enhanced signals to met predetermined conditions which more reliably define the trigger for an appropriate response.

In a further example, it is also known as discussed previously, to process the output of a video camera to provide a time related indication of the past movement of a body through its field of view.

It is typical for each of the abovementioned types of sensors to be used individually each having their own different predetermined characteristics which must be met before triggering an appropriate response. These sensors and their processed outputs are then further processed in a logical but serial fashion. It is likely therefore that if both sensors are triggered by an appropriate predetermined characteristic an intrusion situation has been correctly determined. It however only one of the sensors is triggered there is uncertainty in the determination and a greater likelihood of false triggering.

The invention to be described uses two quite different sensors using disparate portions of the electromagnetic spectrum to be matched, for example using the lowest resolution sensor (eg a PIR) as the map for zoning of the highest resolution sensor (eg high resolution CCD video).

In one example of the prior uses of two different types of sensors, a PIR sensor is mounted near the ceiling in a corner of a room opposite a doorway, and a video camera is mounted over the doorway pointing towards the interior of the room. In this example, the fields of view of each sensor partially overlap and may be used to support the operation of the other. However, it is believed by the inventor that this approach can only be useful if it is known how the sensor fields actually overlap and the predetermined characteristics of each sensor are interrelated in a reliable and coordinated manner.

In another example, a PIR sensor mounted near the ceiling in a corner of a room, and a video camera mounted adjacent to it, are both directed towards the center of the room with only a portion of their fields of view overlapping.

It is known to use one and then other output signals from these two different type of sensors. However, there does not appear to exist any evidence of the combination of their output signals or any evidence of the adaption of the output signals of one sensor to mimic one or more of the characteristics or output signals of the other, so that the sensor signals can be further co-processed using data fusion techniques to determine whether one of a set of sensor interdependent predetermined conditions is matched.

Furthermore the inventor has determined that matched portions of the field of view of each sensor can be processed in a manner that optimises the relevance of the signals detected and which can together more positively identify intrusions into the field of view of the sensors and in particular the matched portions of their field of view.

Therefore, it is an aspect of the invention to provide an arrangement of sensors having at least one of their characteristics such as for example their fields of view, processed such that the operation of one sensor can be interrelated with the operation of the other and so that the predetermined condition required to trigger an appropriate response is determined so as to account for the matched portions of their field of view and the matched characteristic of the sensors.

Sensor arrangements having matched spatial reception and detection characteristics as well as matched portions of their field of view, such as fox example setting up the same fields of view and/or aspect ratios will enable the use of very sophisticated predetermined conditions and data fusion to improve the likelihood of reliable triggering of the surveillance system.

BRIEF DESCRIPTION OF THE INVENTION

In a broad aspect of the invention a sensor apparatus comprises a signal processing means, a first sensor having a predetermined field of view and a signal output representative of at least one characteristic of said field of view, a second sensor having a predetermined field of view and a signal output representative of at least one characteristic of said field of view, wherein at least a portion of said first sensor field of view is common to said second sensor field of view and said processor is adapted to process said first and second signal outputs associated with at least said common field of view of said sensors.

In a further aspect of the invention according to the previous aspect, the field of view of said first and second sensor is sectorized.

In yet a further aspect of the invention according to the previous aspect, said common field of view comprises one or more sectors of said first and second sensors.

Specific embodiments of the invention will now be described in some further detail with reference to and as illustrated in the accompanying figures. These embodiments are illustrative and are not meant to be restrictive of the scope of the invention.

BRIEF DESCRIPTION OF THE DRAWINGS

FIG. 5 depicts a functional block diagram of a video camera apparatus;

FIG. 6 depicts a pictorial representation of the side of the field of view of a video camera apparatus;

FIG. 7 depicts a pictorial representation of the plan view of the field of view of a video camera apparatus;

FIG. 8 depicts a pictorial representation of sector created within the field of view of a video camera which correlate to a sectorised PIR sensor field of view;

FIG. 11 depicts a typical signal conditioned pulse train produced by a PIR sensor.

DETAILED DESCRIPTION OF AN EMBODIMENT OF THE INVENTION

Figure 1:
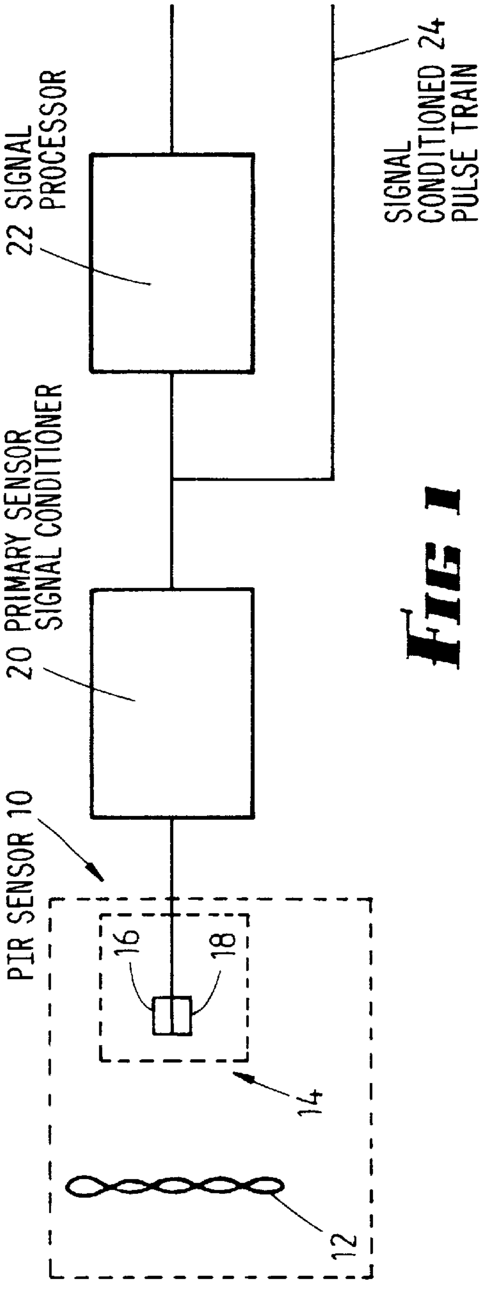
FIG. 1 depicts a functional block diagram of PIR sensor apparatus.

It will be appreciated that the invention relates to the benefits of matching the characteristics of different sensors in bush a way as to make combined use of the sensor signal outputs. The matching may require changes to the sensors themselves and/or the way in which their output signals are processed.

Thus the following description uses well known security system components such as PIR sensors and video cameras with which to demonstrate how two different sensors can be combined. However, the principle of the invention is clearly applicable to other combinations of sensors used or yet to be created for use for example in security and surveillance systems.

In this embodiment the sector field of view of a PIR sensor is imitated by the sectorisation of the field of view of a video camera Thus when the PIR sensor output signal is such as to be representative of say the presence of an intruder in a sector, the video field of view can be examined to determine whether it also provides a signal representative of the presence of an intruder in a sector, The reverse holds as well.

Of course the determination of whether a certain predetermined condition exists will in practice be more sophisticated than that described above, but, the principle is clearly disclosed by this example so that it may be used to suit different applications and/or sensors.

Unlike simple “double knock” sensors which take the logical combination of the status of the two sensors, the proposed invention may apply time and/or amplitude domain signal processing to correlate the output signals of each sensor.

This approach offers significant false alarm reduction capabilities, For example a scene may have both thermal turbulence affecting the PIR sensor and moving shadows affecting the video sensor—a “double knock” system would always false alarm whereas the proposed invention will not normally alarm. In one implementation of the invention, “pulse rates” in outputs of sensor signal processing paths are correlated and in more sophisticated versions the time and amplitude histories are correlated.

In a simple implementation of this aspect of the invention, the time history of the disturbances as measured by the PIR can be correlated with the time history of the disturbances of the video signal output from the segmentation processor. A close matching of the repetition rate of disturbances between the two sensors gives a high confidence level that they are detecting the same object(s) and which may then be signalled as An alarm. A low correlation is indicative of uncorrelated causes and would be Ignored.

A more sophisticated implementation of this aspect of the invention may use the amplitude history of the signal from the PIR and the video segmentation processor to allow one or more analysis processes, such as, first order derivative matching or full spectral correlation. This provides a means of determining whether a certain predetermined condition exists which then allows an alarm decision to be made on the basis of substantially matched signals of a predetermined type.

Further sophistication may be provided by weighting the signals received by the sensors based on signal quality determination from each sensor element. In the extzeme circumstance of feailure or sabotage of one sensor the remaining sensor can automatically revert to single sensor determination conditions while indicating a fault status in the other sensor.

To understand the embodiment and the invention more fully it is instructive to review the basic operation of two preferred types of sensors.

FIG. 1 depicts a simplified functional block diagram of a PIR sensor 10 comprising a reflection or refraction element 12 more about which will be described later, a focal plane sensor 14 comprising a pair of elements, 16, 18; a primary senses signal conditioner 20 and a signal processor 22.

A PIR sensor senses infrared radiation which is typically radiated from heat generating sources (e.g. humans, animals, light sources, etc). The primary radiation collection element of this type of energy is a reflection or refraction element 12 (shown in this representation as a series of refraction (lens) elements). As will be described in greater detail this element 12 effectively creates a number of sectors within the field of view of the PIR sensor.

There are a large variety of primary radiation collection element configurations such as for example a convex mirror, or an accurate array of fresnel lenses, etc, which may be used with filters having a predetermined infrared radiation pass band (white light immunity), etc.

Figure 4:
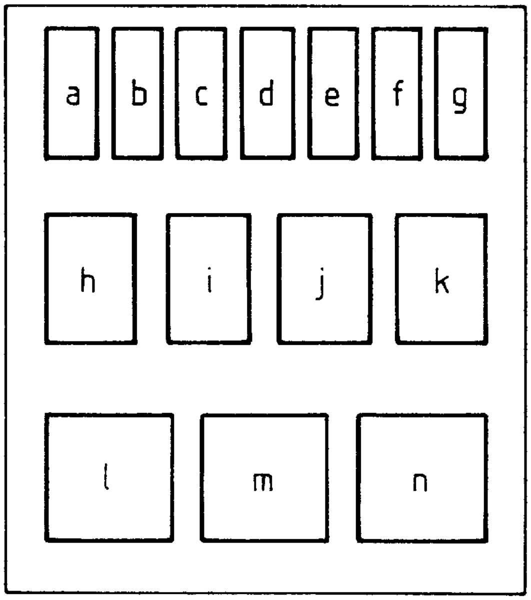
FIG. 4 depicts a pictorial representation of a sectorised PIR sensor field of view.

In this embodiment an array of fresnel lenses as represented pictorially in FIG. 4 produces a number of sectors of sensitivity within the field of view of the PIR sensor.

Figure 2:
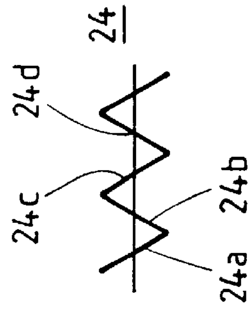
FIG. 2 depicts a side view of the field of view of a PIR sensor.
Figure 2:
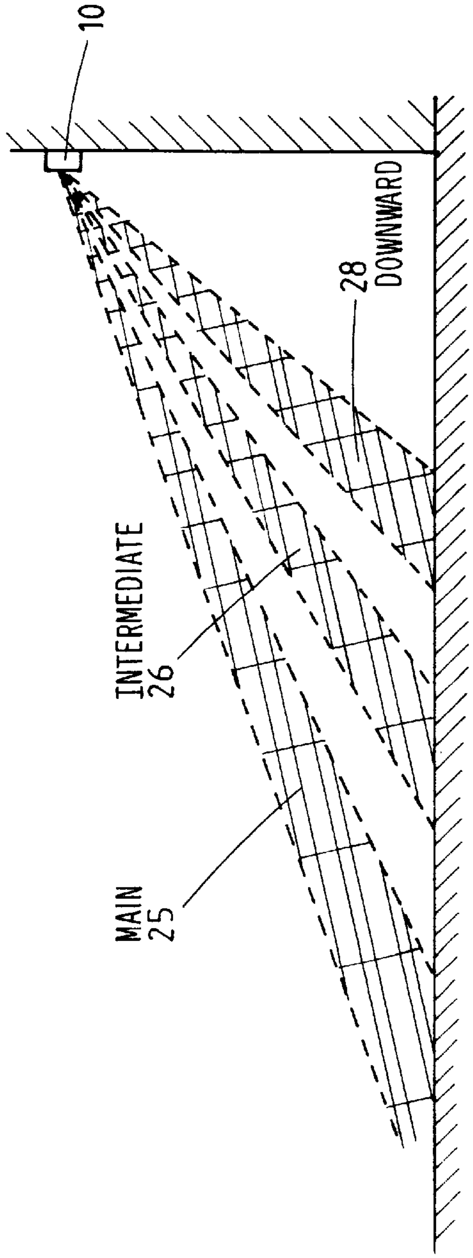
Figure 3:
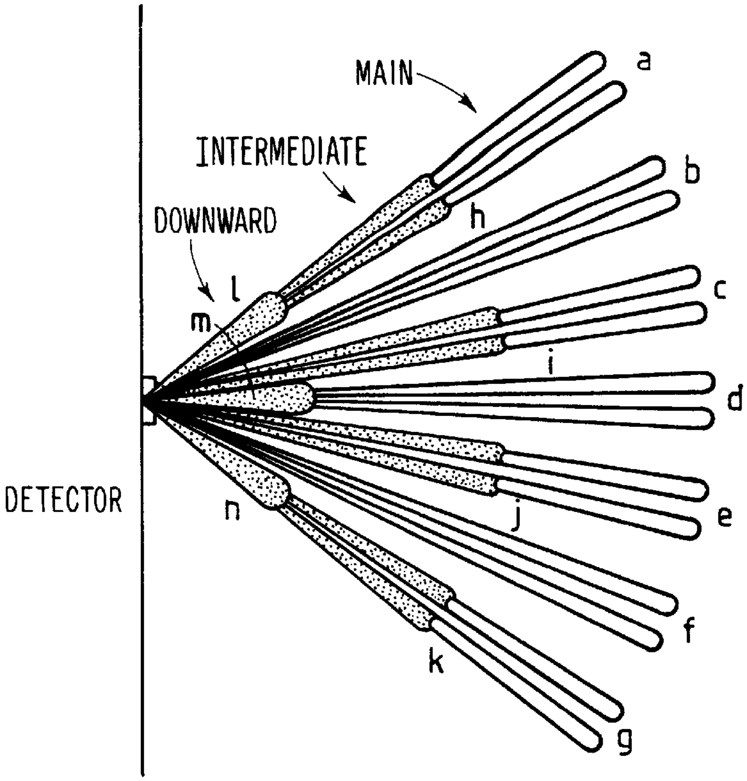
FIG. 3 depicts a plan view of tho field of view of a PIR sensor.

The sectors themselves are pictorially represented in FIGS. 2 and 3.

The infrared sensitive sensor elements 16 and 18 are located in a circuit board mounted component appropriately electrically biased which forms a part of an electronic circuit within the primary sensor signal conditioner 20.

The sensor signal conditioner typically filters, amplifies and wave-shapes the pulses which result from infrared radiation impinging upon the sensor elements 16 and 18. In some embodiments both the sensors and signal conditioner may reside on the same substrate thus providing a monolithic high function sensor element.

As an intruder enters a sector defined by one of the fresnel lenses a portion of the infrared radiation emitting from that intruder is focused onto the sensor 14 and a signal is generated by the sensor, The sensor comprises a pair of elements 16, 18 which produce signals of opposite polarity so that when one sector is entered the signal produced consists of a positive then a negative or negative then positive going pulse dependent upon the direction of travel of the intruder and whether the intruder is hotter or solder than the background.

A typical signal conditioned pulse train is depicted in FIG. 11 at 24, showing a negative 24*a* then positive 24*b* going signal as the intruder moves through one sector and a successive negative 24*c* then positive 24*d* going signal as the intruder moves through an adjacent sector. The signal processor 20 typically translates the pulses into an indication of pulse activity and may digitise the pulse activity for specialised digital signal processing. This however, may also be performed at a different point in the system which may be remote from the PIR sensor housing.

Unfortunately it is difficult to determine whether the successive sector entered by the intruder is horizontally adjacent (indicative of movement towards or away from the PIR sensor) or laterally aligned (indicative of movement right to left or left to right of the PIR sensor).

It is also difficult to determine whether the signals generated by the PIR sensor are a result of other effects such as air distubance, heating, small animals, internal noise , radio frequency interference, etc.

Two pairs of sensors (quad PIR sensors) are sometimes used in alternate polarity configuration to increase the number of signals and provide a distinctive pair of pulse trains which can, if they match a predetermined condition, be used to decrease the likelihood of initiating an unnecessary response caused by radio frequency interference.

FIG. 2 depicts a side view of a typical PIR sensor showing main 25, intermediate 21 and downward 28 grouped sectors and FIG. 3 depicts a plan view of the various main, intermediate and downward group sectors. These sectors are created by the fresnel lens array depicted in FIG. 4 but they may be created using other forms of optical elements, Each of the 14 sectors depicted in FIG. 3 corresponds to the way in which the fresnel lenses depicted in FIG. 4 collect and refract infrared radiation from the field of view of the PIR sensor. Each lens in the array is identified by a letter a–n for late; reference.

FIG. 5 depicts a simplified functional block diagram of a video camera 26 comprising a radiation reflection or refraction element 28 (preferably but not necessarily a refractive lens arrangement having either a wide or narrow field of view); a visible spectrum sensor device 30 (preferably but not necessarily a CCD array); a primary sensor signal conditioner 32 and a signal formatting circuit 34.

Preferably, the refraction element having a narrow field of view will be 36° horizontal to 260° vertical and a wide field of view element will be 100° by 77° respectively which provides an aspect ratio of 4–3. This is typical of video camera images. However, in this embodiment either the field of view of the video camera in tailored to encompass all of the sectors created by the fresnel lenses of the PIR sensor, or, the physical arrangement of the fresnel lenses is such as to occupy as much as is practical (but not necessarily all—a common portion is all that is required) of the field of view of the video camera as is the case in this embodiment.

The visible spectrum sensor devise 30 is preferably a CCD element array however a large range of photo conductive and semiconductor junction detectors (e.g. MOS devices) as well as the many variants of charge transfer device imagers may also suffice. The versatility of CCD's for high- and low-light imaging, burn-free imaging, low-power consumption, self-scanning their light-weight and high sensitivity provide design options to suit many conditions. MOS technology is typically used to fabricate an array of closely spaced single- or multiple-capacitor imaging elements, referred to as pixels, with on-chip scanning and low-noise amplification. This type of element may comprise the focal-plane image sensor of the video camera of this embodiment. The number and size of the pixels determines such basic characteristics as aspect and resolution. Emerging technologies may provide an alternative to MOS technology i.e. CMOS technology which could provide lower cost, even lower power consumption and more convenient on-chip signal processing.

The primary sensor signal conditioner 32 performs the typical electronic transformation of the CCD output into a video signal, while also performing filtering, amplification and information enhancement such as incorporating information synchronization. Some of these signal processing steps may also be performed by the signal formatting circuit 34.

The video output signal 16 is then made available for further processing in accordance with both or either, typical security related signal transformations and enhancements such as for example super pixelation, spatial filtering, etc. or, sectorisation in accordance with a virtual grid corresponding to the sectors created by the PIR sensor lens array. This sectorisation may alternatively provide at the primary sensor either physically or electronically or combination thereof.

FIGS. 6 and 7 depict the side and plan view of the field of view of a video camera apparatus as used in this embodiment. For the purposes of this description, the field of view of the video camera 26 substantially matches all the sectors of the PIR sensor 10, as will also be revealed in a comparison of FIGS. 2 and 3 with FIGS. 6 and 7. Thus the image obtained by the video camera may be sectorised in the manner pictorially represented in FIG. 8, where sectors a'–n' can correspond to the sectors created by fresnel lenses a–n in FIG. 4. It is preferable to sectorise the higher resolution sensor so as to match the sectors of the lower resolution sensor. In the example, since a PIR sensor is used and is the lower resolution sensor it is preferable to match all of its sectors to the video camera sectorisation largely because a PIR signal output does not distinguish or identify which sector is originating the signal. However, different relatively low resolution sensors may provide this capability which may be one of many such characteristics and therefore only a portion of the sectors a–n, a'–n' need match to provide useable signal outputs for the apparatus of the invention in that circumstance.

Sectorisation of the video signal may be performed at a variety of locations, preferably at the alarm panel location where sufficient computation power and capacity is readily available. However, all manner of signal preprocessing is increasingly being performed at the sensor end of the security information gathering process.

For example, digital format signals output from the basic sensors can be adapted for efficient and reliable transmission sometimes over long distances between the sensor and the alarm panel. Different modulation techniques, digital compression and encryption and information filtering are some of the very many preprocessing steps that can be performed remote of the alarm panel.

Figure 9:
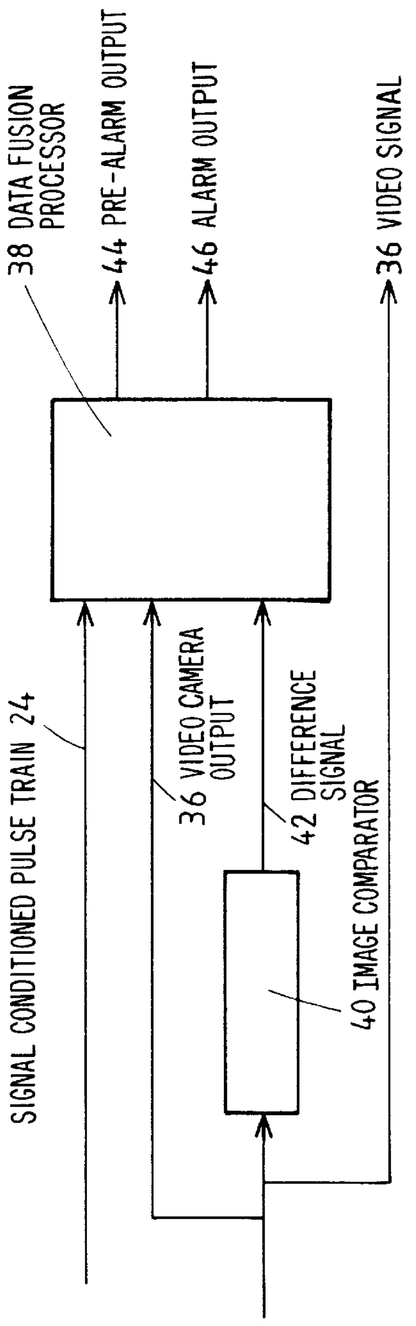
FIG. 9 depicts a functional block diagram of the PIR sensor and video camera output signal processing circuit.

As depicted in FIG. 9 the signals 24 and 36 output from the PIR sensor 10 and video camera apparatus 26 respectively are received by a data fusion processor 38.

If the unprocessed video camera output 36 is received it may require some preprocessing to sectorial the image before the fusion process of this embodiment can commence. Preprocessing of this type may be done electronically In an appropriate circuit or done only with software.

In one embodiment of the invention the processor may perform video image segmentation which divides (maps) the video image into blocks matching the PIR sensor segments. By integrating the video image segments corresponding to those mapped by the PIR lens elements onto the + sensor, repeating the process for the – sensor, subtracting the result and repeating the process at the video field rate a waveform may be constructed which would match that generated by the PIR if it were sensitive to visible wavelengths (and optics corrected to suit). It is then possible to apply various levels of correlation between the signal derived from the PIR and the image segmentation processor to determine the probability that both are responding to the same disturbance of interest (c.f. video seeing moving shadows or PIR seeing thermal turbulence, for example).

In simple and practical terms, if a particular sector, say in n', of the video output generates a signal representative of a precondition (such as for example an out of character contrast change) the PIR sensor can be interrogated to determine whether there is a predetermined characteristic signal (such as for example a positive to negative or negative to positive going pulse) in the corresponding sector .

If both the predetermined characteristics match an appropriate response is warranted.

In another implementation the signals may be combined and only the combined signal is used to determine whether a particular predetermined characteristic is present.

Yet another implementation may require determination of a "speed magnitude" from the pulse repetition rate from the PIR sensor which can be correlated to a speed computation made from the target tracking output of a video tracker by placing the result over the map of the PIR segments to deduce the equivalent PIR pulse repetition rate for the target(s).

If only one of the sensor signals matches a predetermined condition, an appropriate response may be to do nothing, or to delay triggering an appropriate response until additional information is available.

If within the predetermined delay period an adjacent sector say m for the PIR and m' for the CCD camera exhibit a predetermined characteristic signal (such as for example a negative to positive or a positive to negative going pulse in the PIR and a contrast change in the video signal) both devices will then have exhibited signals commensurate with a further predetermined condition and an appropriate response will then be warranted.

The information gathering process can be elongated or relatively short dependent on the security environment in which the apparatus is working.

Image comparator 40 receives the video signal 36 and generates a difference signal 42, for example the difference between successive video signal frames or other predetermined periods between frames. The difference signal or other signals way be created and a data fusion processor may advantageously use these difference signals and others (such as weighted sector averages) to improve the sophistication of the predetermined characteristics required to trigger an appropriate response. A data fusion processor may cross reference time-delayed sector and or real-time sector information to improve the reliability of the determination process for triggering an appropriate response.

This would enable a distinction between a non-intruder circumstance such as the pasting of a shadow through the field of view of both the video and PIR sensor. A shadow by itself may provide sufficient contrast change or meet one or more of the video related predetermined characteristics but would not provide the necessary input to the PIR sensor to match any of its predetermined characteristics. Thermal disturbance or radio frequency interference may also meet the detection criteria of the PIR sensor, but will not provide the necessary input to the video sensor to match its predetermined characteristics.

Figure 10:
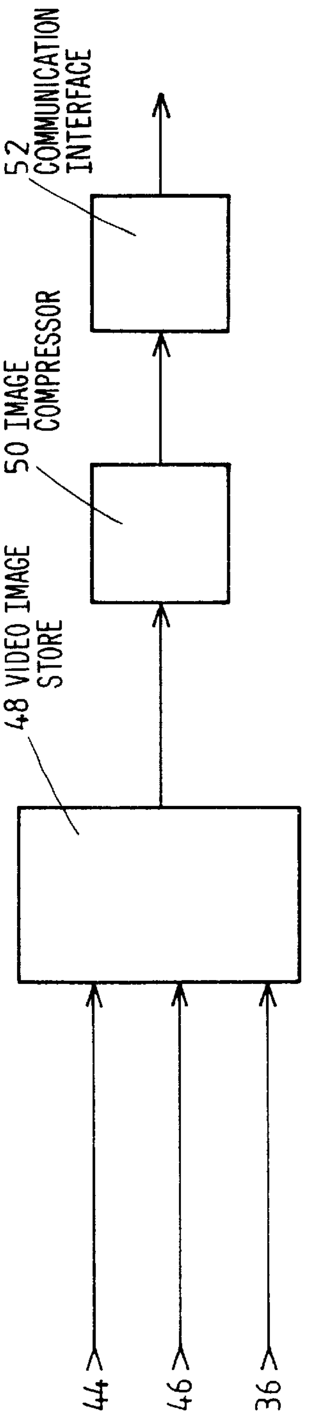
FIG. 10 depicts a functional block diagram of the control panel of the preferred remote surveillance system interface.

The data fusion processor 38 may have one or more output signals and in this embodiment is shown as having a pre-alarm output 44 and an alarm output 46. The pre-alarm output 44 may result from the sensing by one of the sensors a match with one or more predetermined conditions and which may then be used to pre-store and/or retrieve certain video signal information previously obtained. If, after data fusion, an alarm condition is determined to exist the pre-stored image may be used as evidence of the cause of the alarm. Because both sensors' fields-of-view are matched, the alarm cause will always be pre-stored. This previous information may be used further by the fusion process or be used to increase the probability of providing a reliable trigger condition for an appropriate response, All the signals 44, 46 and 36 are shown in FIG. 10 as being received by a video image store 48 which would delay (between say 0 and 10 seconds) sending signals to the local displays or to remote displays or both, In this embodiment an image compressor 50 and a communication interface 52 are associated with distribution of both the image and alarm trigger signals.

A security system using the invention may also use different types of sensors, for example pressure pads, laser boam interruption detectors, volumetric change detectors, etc, and the fusion component of the system would be appropriately modified to sector and/or sectorise one or more of those sensors so that the system may use more sophisticated predetermined conditions as triggers for appropriate responses.

It will be appreciated by those skilled in the art, that the invention is not restricted in its use to the particular application described and neither is the present invention restricted in its preferred embodiment with regard to the particular elements and/or features described herein. It will be appreciated that various modifications can be made without departing from the principles of the invention, therefore, the invention should be understood to include all such modifications within its scope.

I claim:

1. A sensor apparatus comprising:

a signal processor;

a first sensor having a sectored predetermined field of view and a signal output representative of at least one characteristic of at least one sector of said field of view; and a second sensor having a sectored predetermined field of view and a signal output representative of at least one characteristic of at least one sector of said field of view;

wherein said first sensor is a spatially higher resolution sensor than said second sensor, and said first sensor is sectored such that each of a plurality of sectors lie within or are spatially equal to a respective plurality of sectors of said second sensor, and said processor is adapted to process at least said first and second sensor signal outputs for each of said respective sectors of said first and second sensors to determine whether said signals are representative of common activity in those respective sectors and only if that is so provide an output signal representative of that common activity.

2. A sensor apparatus according to claim 1 wherein at least one of said sensors is a PIR sensor.

3. A sensor apparatus according to claim 2 wherein said PIR sensor comprises a physical means to sectorise said field of view.

4. A sensor apparatus according to claim 1 wherein at least one of maid sensors is a video camera device.

5. A sensor apparatus according to claim 4 wherein said video camera device comprises means to sectorise said field of view.

6. A sensor apparatus according to either of claim 3 or 5 wherein said means to sectorise is a lens means.

7. A sensor apparatus according to either of claim 3 or 5 wherein said means to sectorise is an electronic circuit or software means.

8. A sensor apparatus according to claim 1 wherein said sensors detect different portions of the electromagnetic spectrum.

9. A sensor apparatus according to claim 1 wherein said signal processing means processes said first and second sensor signal outputs for one or more of said common sectors to determine whether a common activity is being detected by said sensors.

10. A sensor apparatus according to claim 1 wherein said signal processing means processes said first and second sensor signal outputs using time domain and/or amplitude domain signal analysis to determine whether a common activity is being detected by said sensors.

11. A sensor apparatus according to claim 1 wherein said signal processing means for processing said first and second sensor signal outputs is located remote of said sensor apparatus.

12. A sensor apparatus according to claim 1 wherein said signal processing means sectorises one or more of said fields of view.

13. A sensor apparatus according to claim 1 wherein said signal processing means uses data fusion to determine whether a common activity is being detected by said sensors.

14. A sensor apparatus according to claim 1 wherein said signal processing means uses data from the remaining sensor in the event of failure of one of said sensors to determine the activity detected by said sensors.

15. A sensor apparatus according to claim 1 wherein said signal output of at least one of said sensors is stored for a period of time for use as a record of the past activity detected by said sensor wherein said signal processing means determines whether a common activity is being detected by said sensors.

16. A sensor apparatus according to claim 1 wherein said sectorisation may comprise a virtual sectorisation of a portion of the field of view of a said sensor.

* * * * *